(12) United States Patent
Perdicaro et al.

(10) Patent No.: US 11,087,191 B2
(45) Date of Patent: Aug. 10, 2021

(54) SELECTIVE APPLICATION OF PLASMA TREATMENT

(71) Applicant: Hewlett-Packard Development Company, L.P., Spring, TX (US)

(72) Inventors: Frank Perdicaro, Corvallis, CO (US); Tracy A. Lang, Corvallis, CO (US); Thomas A. Saksa, Corvallis, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/771,710

(22) PCT Filed: Mar. 7, 2018

(86) PCT No.: PCT/US2018/021275
§ 371 (c)(1),
(2) Date: Jun. 11, 2020

(87) PCT Pub. No.: WO2019/172900
PCT Pub. Date: Sep. 12, 2019

(65) Prior Publication Data
US 2021/0089849 A1 Mar. 25, 2021

(51) Int. Cl.
*H04N 1/60* (2006.01)
*G06K 15/00* (2006.01)
*G06K 15/10* (2006.01)
*G06K 15/02* (2006.01)

(52) U.S. Cl.
CPC ....... *G06K 15/4065* (2013.01); *G06K 15/102* (2013.01); *G06K 15/1836* (2013.01)

(58) Field of Classification Search
CPC ............. G06K 15/4065; G06K 15/102; G06K 15/1836
See application file for complete search history.

(56) References Cited

U.S. PATENT DOCUMENTS

| | | |
|---|---|---|
| 7,419,257 B2 | 9/2008 | Mood et al. |
| 9,469,126 B2 | 10/2016 | Willems |
| 2006/0201361 A1 | 9/2006 | Wiedemer |
| 2008/0192100 A1 | 8/2008 | Nakajima |
| 2011/0199446 A1 | 4/2011 | Ram et al. |
| 2011/0134188 A1 | 6/2011 | Arakawa |
| 2013/0127969 A1 | 5/2013 | De Schamphelaere et al. |
| 2014/0160197 A1 | 6/2014 | Hirose et al. |
| 2016/0329192 A1 | 11/2016 | Sieber et al. |

*Primary Examiner* — Moustapha Diaby
(74) *Attorney, Agent, or Firm* — Fabian VanCott (57) ABSTRACT

A method may include with a raster image processor, creating pretreatment plane rasterized image data from source image data and, with a plasma emitter, selectively applying a plasma treatment to a surface of a print media based on the pre-treatment plane rasterized image data. A printing device may include a raster image processor to execute an image analysis module to create pre-treatment plane rasterized image data from source image data and a plasma emitting device to selectively apply a plasma treatment to a surface of a print media based on the pre-treatment plane rasterized image data.

15 Claims, 5 Drawing Sheets

SELECTIVE APPLICATION OF PLASMA TREATMENT

BACKGROUND

Printing devices transfer a printing fluid from a printing fluid source to the surface of a print media. The transfer of the printing fluid to the surface of the print media may be accomplished using a number or methods including inkjet printing and web-press printing.

BRIEF DESCRIPTION OF THE DRAWINGS

The accompanying drawings illustrate various examples of the principles described herein and are part of the specification. The illustrated examples are given merely for illustration, and do not limit the scope of the claims.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Printing devices such as inkjet printing devices and web-press printing devices transfer ink to the surface of a print media. The print media may be any type of print media including, but not limited to, paper, plastics, metals, and pharmaceuticals, among others. Some of these print media may be pretreated prior to application of the printing fluid in order to improve print quality of the image being formed on the print media. One method of pretreatment of the print media includes the treatment of the paper using a liquid pretreatment coating to the print media. This pretreatment coating may be applied to the print media in-line prior to printing. However, such an application may slow down the printing process. Additionally; the liquid pretreatment coating is to be resupplied after the source has been exhausted. As a result, operation and maintenance of the printing device may increase in costs due to the use of the liquid pretreatment coating.

One method of pretreatment includes plasma pre-treatment processes. In some examples, plasma pre-treatment of the print media may treat an entirety of the print media. However, this plasma pre-treatment of the entirety of the print media could significantly increase the time to produce the printed image as compared to not pre-treating the print media. This may be especially true in web presses where an image is formed onto a web (print media) at a rate that exceeds tens of thousands of impressions per hour. Continually plasma pre-treating the web in this example may reduce the impression outputs per hour.

The present specification describes a method that includes with a raster image processor, creating pre-treatment plane rasterized image data from source image data; and with a plasma emitter, selectively applying a plasma treatment to a surface of a print media based on the pre-treatment plane rasterized image data.

The present specification also describes a printing device that includes a raster image processor to create a pre-treatment plane rasterized image data from source image data and a plasma emitting device to selectively apply a plasma treatment to a surface of a print media based on the pre-treatment plane rasterized image data.

The present specification further describes a computer program product, the computer program product that includes a computer readable storage medium comprising computer usable program code embodied therewith, the computer usable program code to, when executed by a processor: create pre-treatment plane rasterized image data from source image data: and selectively apply a plasma treatment to a surface of a print media based on the pre-treatment plane rasterized image data.

As used in the present specification and in the appended claims, the term "printing fluid" is meant to be understood as any substance, except a plasma, that may be ejected onto or otherwise applied to the surface of a print media.

Figure 1:
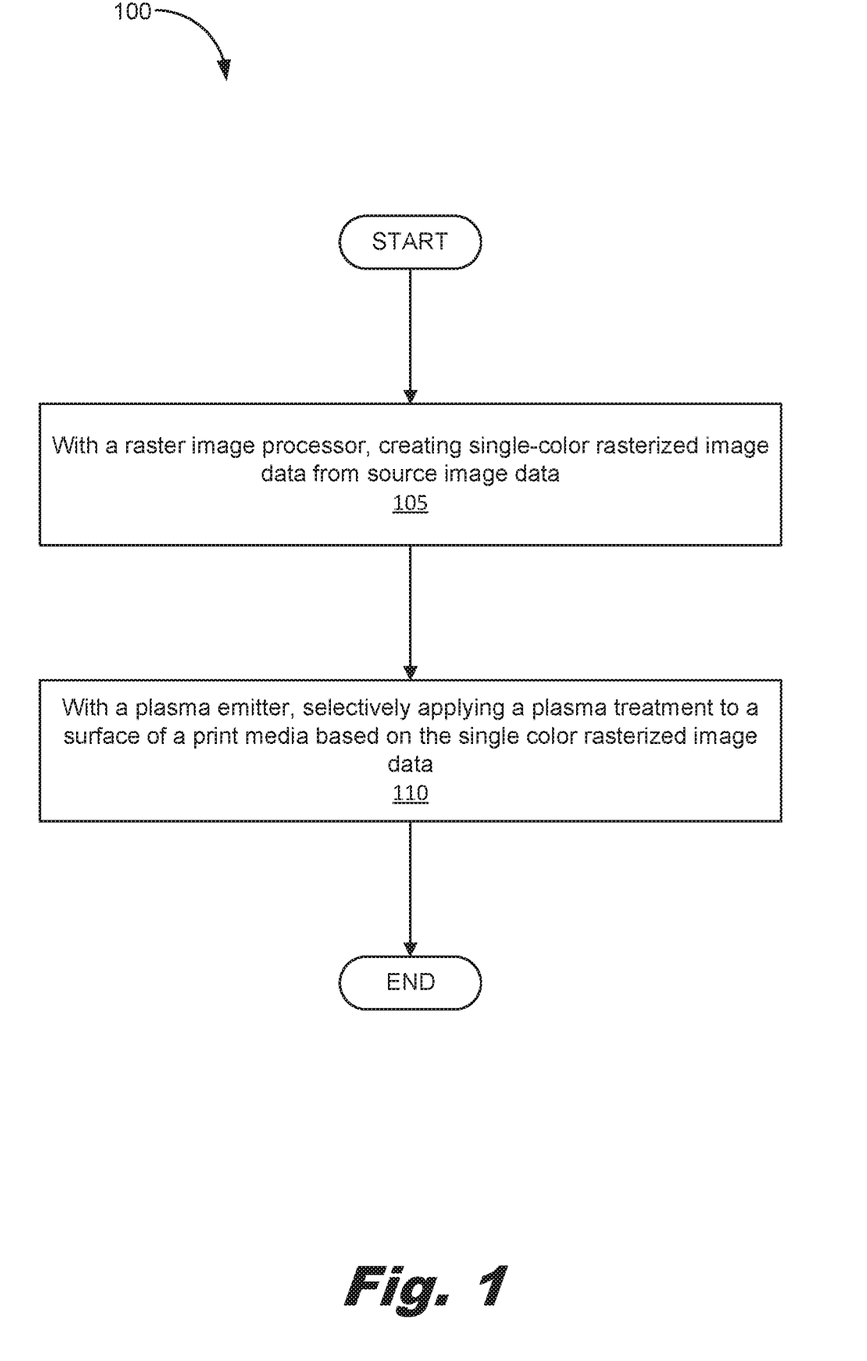
FIG. 1 is a flowchart showing a method according to an example of the principles described herein.

Turning now to the figures, FIG. 1 is a flowchart showing a method (100) according to an example of the principles described herein. The method (100) may begin with creating (105) pre-treatment plane rasterized image date form source image data with a raster image processor. Creating (105) the pre-treatment plane rasterized image data may include a number of processes or combination of processes that define, via the image data, those portions of the print media where any color or type of printing fluid is to be applied to the print media. In an example, creating (105) the pre-treatment plane rasterized image data may include analyzing image data to be provided to a printing device used to form images on the print media. In an example, color planes defining which portions of the print media a certain color of printing fluid is to be applied may be used to define the pre-treatment plane rasterized image data. In an example, a monochromatic image data defining which portions of the print media are to receive any type of printing fluid may be used to define the pre-treatment plane rasterized image data.

During this analysis, the raster image processor of, for example, the printing device, may separate image data into a number of data planes describing how the printing device is to apply any number of layers of printing fluid to the print media. In an example, the image data may be separated into Cyan, Magenta, Yellow, and Black colored data planes. In this example, a number of these colored data planes may be used in the method (100) to, with a plasma emitter, selectively applying (110) a plasma treatment to a surface of a print media based on the pre-treatment plane rasterized image data: the individual color planes derived. In this example, the coverage of printing fluid and where the printing fluid is to be applied on the print media may be calculated from a bit map file, separately for each color separation, by counting pixels. In some examples, the coverage of printing fluid and where the printing fluid is to be applied on the print media may be calculated according to CIP3 (International Cooperation for Integration of Prepress, Press, and Postpress) standard. In this example, a two-dimensional (2D) mapped file may be created containing information about the image to be formed on the print media including information about the print fluid and preview images. This 2D mapped file indicates on a pixel-by-pixel level wherein printing fluid to be applied at each frame printed. When 2D mapped file is executed by the raster image processor, the printing device may cause the selective application (110) of the plasma treatment to a surface of a print media based on this type of pre-treatment plane rasterized image data.

In an example, instead of separating the image data into different colored separations, a single separation may be made at a reduced resolution. In this example, a fixer blooming filter may be used to initiate a fixer blooming process in order to decide where to apply (110) the plasma treatment. A fixer blooming filter may combine the different color separations and reduce the resolution. In an example, a single lower resolution image can be produced using the raster image processor by processing the image data in a monochromatic mode at a lower resolution than the original image data creating (105) pre-treatment plane rasterized image data from source image data. In any of the image data rasterization processes described above, a lower resolution image may be created (105) in order to reduce the processing completed by the raster image processor, Additionally, rasterizing the image data in a pre-treatment plane or in a single monochromatic color also reduces the processing by the raster image processor and also ignores what type of printing fluid is used and focuses on the areas on the print media where any type of printing fluid is to be applied.

The creation (105) of the pre-treatment plane rasterized image data from source image data results in a two-dimensional mapping of a relatively lower resolution pixels covering the print media (web) of the printing device. Where the pixels indicate ink is to be applied to a specific area of the print media. This indicates to the raster image processor, during operation of the printing device, where a plasma emitter is to apply (110) a plasma treatment to that area of the print media.

As described, after the image data has been rasterized for the purpose of determining where a printing fluid is to be applied on the print media as described herein, a plasma treatment process may be applied (110). In this example, the plasma treatment is applied (110) to those specific areas denoted by the pre-treatment plane rasterized image data defining where printing fluid is to be deposited.

The plasma emitters used to conduct the plasma treatment to the print media prior to application of the printing fluid may be any type of plasma emitter. In an example, the plasma emitter may by any type of selectively energized electrodes that emit plasma therefrom. In an example, the plasma emitter is formed into an array of individual plasma emitters that may address an area of the print media. These plasma emitter arrays may include any number of plasma emitters and may be grouped into any number of groups of arrays to form a plasma emitter bar.

The individual plasma emitters, in an example, may be individual pointed electrodes, filament electrodes, cylindrical electrodes, or electrodes of other shapes that produce the plasma as described herein and/or conform to the media. In an example, these electrodes may be arranged in hexagonal layouts and with offsets to provide a resolution that could apply the plasma emission sufficiently to pre-treat the print media. Because the plasma emitters use pulsed plasma (spark-on-demand), any system described herein may be a switched system of plasma emitters. In an example, instead of a hexagonal layout, any other type of layout of the array of plasma emitters is contemplated including a rectangular layout.

In an example, the plasma emitters may be inductive plasma generators. Again, individual inductive plasma generators may be arranged in arrays of inductive plasma generators as described herein. Inductive plasma generators may use a consistently generated or nearly consistently generated plasma arc to selectively apply (110) the plasma treatment to the print media.

In an example, the array of plasma emitters may be used simultaneously in order to plasma treat a plurality of areas of the print media. In an example, the array of plasma emitters may be used sequentially with an exact or near exact parallel to fluid ejection devices formed on inkjet type fluid ejection devices. In this example, each plasma emitter may have a matching fluid ejection device on an inkjet print bar.

In an example, the array of plasma emitters may be formed on a bar traversing the print media width perpendicular to the direction of travel of the print media through the printing device. In an example, this bar may be curved along a parallel direction of travel of the print media through the printing device.

In an example, the plasma emitter may further include a magnetic circuit. In this example, the magnetic circuit may steer, guide, or otherwise manipulate the plasma emitted from the plasma emitters. In this example, the plasma bar maintaining the plasma emitters may emit plasma to one side of the print media for treatment. However, the magnetic circuits may, from an opposite side of the print media, steer, guide, or otherwise manipulate the plasma through the print media. The magnetic circuit may be used with the plasma emitters to modulate the plasma effects either magnetically, electrically, or both. In some examples, the magnetic circuit may be modulated to direct the plasma emissions from the plasma emitters across any portion of the print media.

Figure 2:
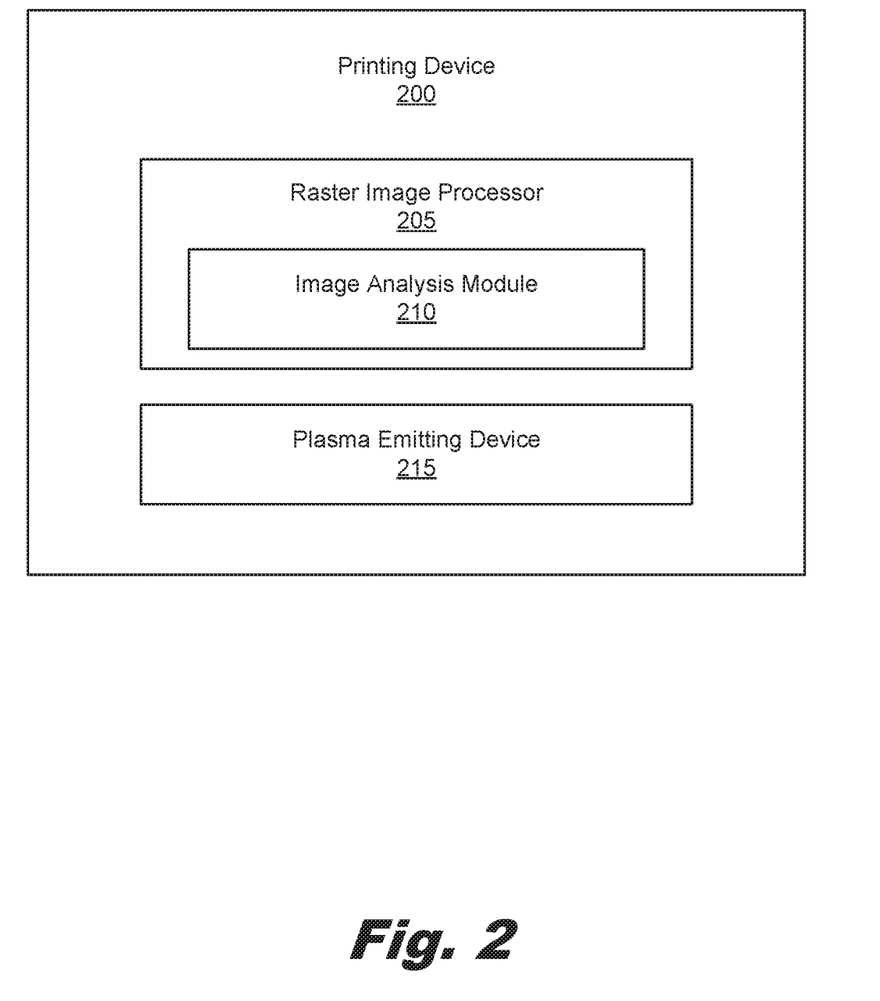
FIG. 2 is a block diagram of a printing device according to an example of the principles described herein.

FIG. 2 is a block diagram of a printing device (200) according to an example of the principles described herein. The printing device (200) may include a raster image processor (205) to execute an image analysis module (210) in order to create pre-treatment plane rasterized image data from source image data. The printing device (200) may also include a plasma emitting device (215).

The printing device (200) may be any type of printing device that receives a printing fluid and deposits it on a print media. In an example, the printing device (200) is an inkjet printing device that includes a fluid ejection die to eject an amount go printing fluid onto the surface of the print media. The fluid ejection die may implement a number of fluid ejection devices such as a resistive device or a piezoelectric device. The fluid ejection devices may, per image data received by the raster image processor, eject a fluid onto the surface of the print media.

The printing device (200) may be, in an example, a web press. In an example, web press may include a number of drums, a photoconductor, and/or a intermediate transfer member to transfer an amount of printing fluid from a number of binary ink developers (BIDs) to the print media. In this example, the BIDs may transfer the printing fluid to the drums according to image data received by the raster image processor. In an example, the printing device (200) may also include those devices associated with a liquid electrophotography (LEP) printing device. In these examples, printing devices, any number of rollers, belts, or other conveying devices may be provided to convey the print media, in this case a web of paper, through the printing device.

Other types of printing devices (200) may be used. In an example, the printing device may be used to eject a biological or medicinal fluid onto a print media. The present specification, therefore, contemplates the use of any type of printing fluid and any type printing device to eject the printing fluid onto a print media. In these examples, the plasma emitting device may be placed upstream of a portion of the printing device that applies printing fluid to the web as described herein. Placement of the plasma emitting device upstream of the BID and drum allows for the selective application of plasma treatment as described herein.

The raster image processor (205) may be any type of processing device that may include the hardware architecture to retrieve executable code from a data storage device and execute the executable code. The executable code may, when executed by the processor, cause the raster image processor (205) to implement at least the functionality of creating pre-treatment plane rasterized image data from source image data and selectively applying a plasma treatment to a surface of a print media based on the pre-treatment plane rasterized image data according to the methods of the present specification described herein. In the course of executing code, the raster image processor (205) may receive input from and provide output to a number of the remaining hardware units associated with the printing device (200) and raster image processor (205).

The image analysis module (210) may be presented to the raster image processor (205) in the form of executable program code that may be executed separately from other executable program code used by the printing device (200). In an example, the image analysis module (210) may be stored as separate computer program product. In another example; the image analysis module (210) within the printing device (200) may be combined within a number of computer program products; each computer program product comprising a number of modules including the image analysis module (210). During execution by the raster image processor (205), the image analysis module (210) may create pre-treatment plane rasterized image data from source image data as described herein. As a result of the execution of the image analysis module (210), a two-dimensional (2D) map of the pre-treatment plane rasterized image data is created. In an example, the resolution of the 2D map is of a lower resolution than that of the original image data received by the raster image processor (205). This 2D map includes a low-resolution of pixels that cover a portion of the web such that where the pixels are present, the printing fluid is to be applied.

The plasma emitting device (215) may then be directed by the raster image processor (205) to selectively apply a plasma treatment to the surface of the web according to the 2D map describing the pre-treatment plane rasterized image data created by the raster image processor (205) and image analysis module (210).

Figure 3:
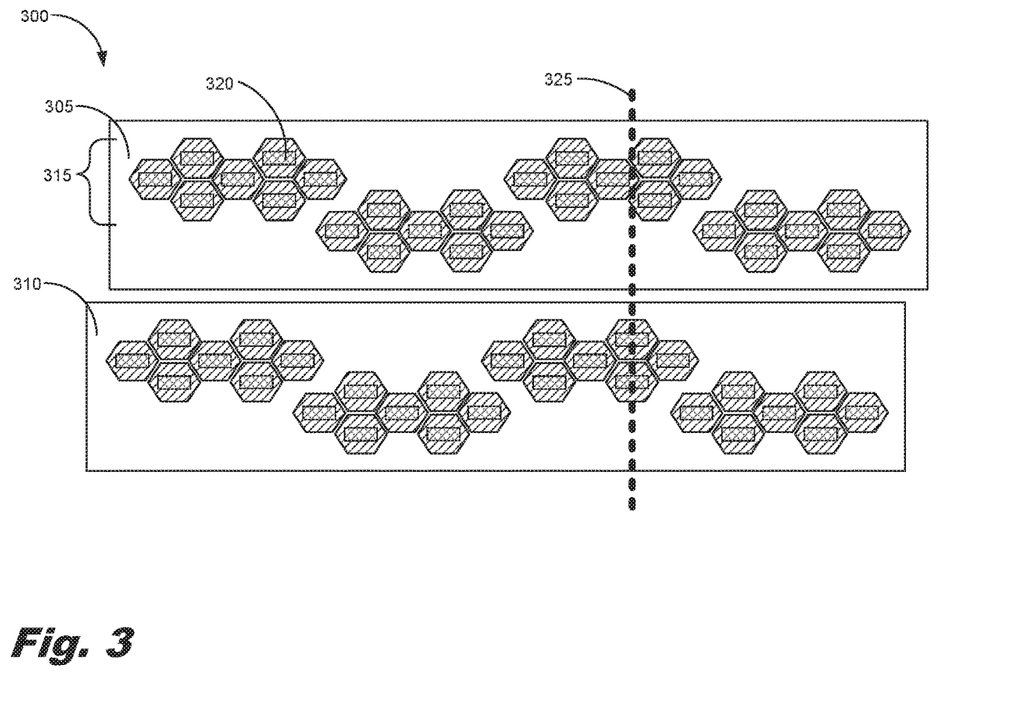
FIG. 3 is a plan diagram of a plasma emitter according to an example of the principles described herein.

FIG. 3 is a plan diagram of a plasma emitter (300) according to an example of the principles described herein. In this example, the plasma emitter (300) may include a sequence of emitter bars (305, 310). Each of the emitter bars (305, 310) may include a number of hexagonal arrays (315) of plasma emitting devices (320). Although FIG. 3 shows a plurality of emitter bars (305, 310), the present specification contemplates the use of a single emitter bar (305,310) or more than what is depicted in FIG. 3. With the two emitter bars (305, 310) shown in FIG. 3, however, the plasma emitting devices (320) arranged in the hexagonal arrays (315) may be offset from each other among the emitter bars (305, 310). In this example, an offset distance (325) shows that, among the plasma emitting devices (320) of the emitter bars (305, 310) a level of redundancy and coverage of an area of the print media may be realized. In this example, the density of the plasma emitting devices (320) may be increased thereby allowing for a more precise plasma pre-treatment of the print media during use. As a consequence, the time to selectively apply the plasma treatment to the surface of the print media based on the pre-treatment plane rasterized image data described herein may be reduced.

Figure 4:
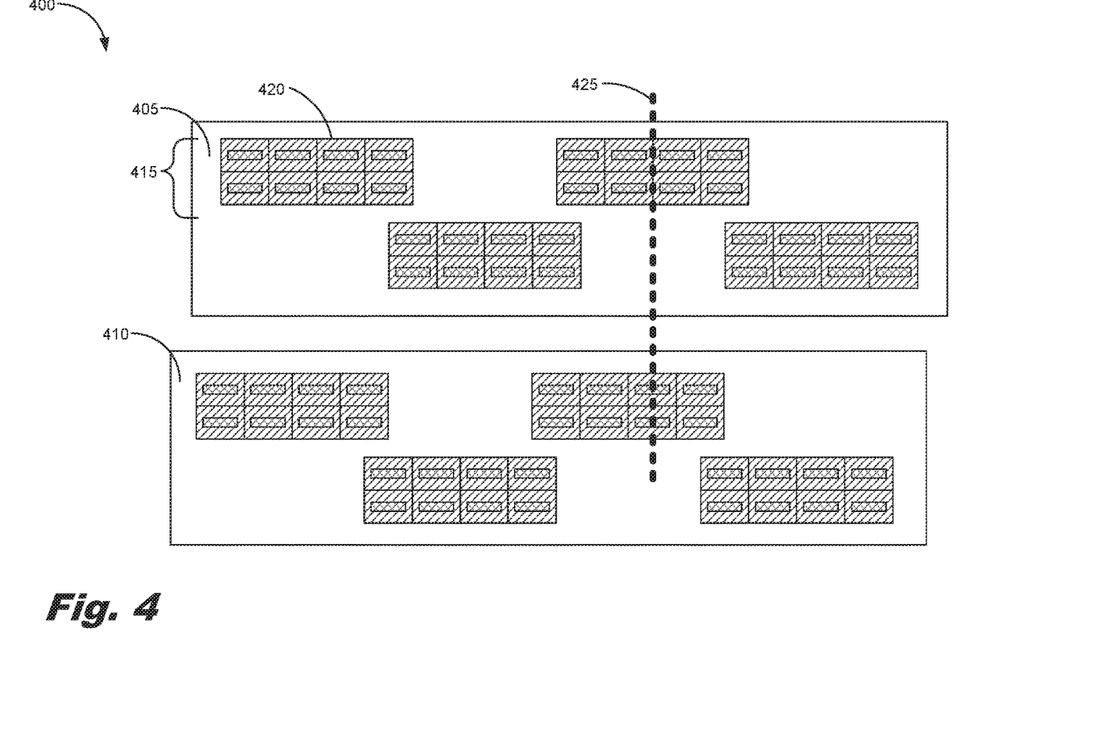
FIG. 4 a plan diagram of a plasma emitter (400) according to an example of the principles described herein.

FIG. 4 a plan diagram of a plasma emitter (400) according to an example of the principles described herein. In this example, the plasma emitter (400) may include a sequence of emitter bars (405, 410). Each of the emitter bars (405, 410) may include a number of square arrays (415) of plasma emitting devices (420). Although FIG. 4 shows a plurality of emitter bars (405, 410), the present specification contemplates the use of a single emitter bar (405, 410) or more than what is depicted in FIG. 4. With the two emitter bars (405, 410) shown in FIG. 4, however, the plasma emitting devices (420) arranged in the square arrays (415) may be offset from each other among the emitter bars (405, 410). In this example, an offset distance (425) shows that, among the plasma emitting devices (420) of the emitter bars (405, 410) a level of redundancy and coverage of an area of the print media may be realized. In this example, the density of the plasma emitting devices (420) may be increased thereby allowing for a more precise plasma pre-treatment of the print media during use. As a consequence, the time to selectively apply the plasma treatment to the surface of the print media based on the pre-treatment plane rasterized image data described herein may be reduced.

Figure 5:
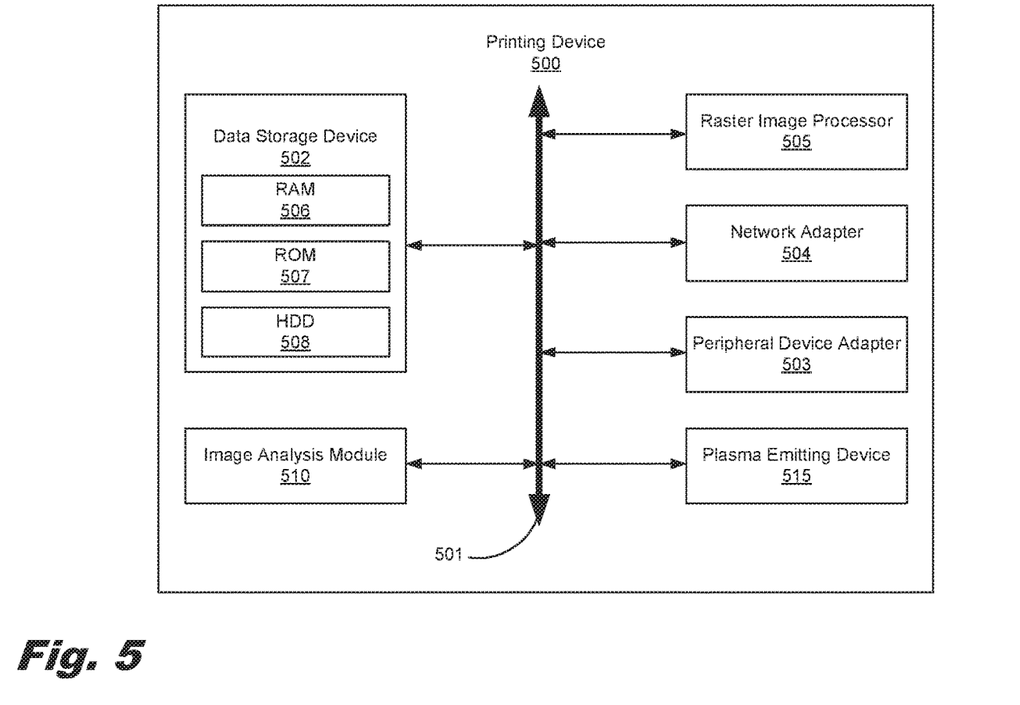
FIG. 5 is a block diagram of a printing device (500) according to an example of the principles described herein.

FIG. 5 is a block diagram of a printing device (500) according to an example of the principles described herein. The printing device (500) may include a raster image processor (505), an image analysis module (510), and a plasma emitting device (515) as described herein. Additionally, to achieve its desired functionality, the printing device (500) may include various hardware components. Among these hardware components may be a number of data storage devices (502), a number of peripheral device adapters (503), and a number of network adapters (504). These hardware components may be interconnected through the use of a number of busses and/or network connections. In one example, the raster image processor (505), image analysis module (510), plasma emitting device (515), data storage device (502), peripheral device adapters (503), and the network adapter (504) may be communicatively coupled via a bus (501).

Again, the raster image processor (505) may include the hardware architecture to retrieve executable code from the data storage device (502) and execute the executable code. The executable code may, when executed by the raster image processor (505), cause the raster image processor (505) to implement at least the functionality of creating pre-treatment plane rasterized image data from source image data and selectively applying a plasma treatment to a surface of a print media based on the pre-treatment plane rasterized image data, according to the methods of the present specification described herein. In the course of executing code, the raster image processor (505) may receive input from and provide output to a number of the remaining hardware units. During operation, the raster image processor (505) may direct the plasma emitting device (515) to selectively emit a plasma charge on the surface of the print media where printing fluid is to be applied. In this example, those portions of the print media that are to be plasma pre-treated due to receiving printing fluid are pre-treated while other portions of the surface of the print media are not pre-treated. This speeds up the plasma pre-treatment process thereby allowing for a relatively speedier printing process relative to pre-treating the entire surface of the print media.

The data storage device (502) may store data such as executable program code that is executed by the raster image processor (505) or other processing device such as the image analysis module (508). The data storage device (502) may specifically store computer code representing a number of applications that the raster image processor (505) or other processor executes to implement at least the functionality described herein.

The data storage device (502) may include various types of memory modules, including volatile and nonvolatile memory. For example, the data storage device (502) of the present example includes Random Access Memory (RAM) (506), Read Only Memory (ROM) (507), and Hard Disk Drive (HDD) memory (508). Many other types of memory may also be utilized, and the present specification contemplates the use of many varying type(s) of memory in the data storage device (502) as may suit a particular application of the principles described herein. In certain examples, different types of memory in the data storage device (502) may be used for different data storage needs. For example, in certain examples the raster image processor (505) may maintain nonvolatile storage in the Hard Disk Drive (HDD) memory (508) and execute program code stored in Random Access Memory (RAM) (506). The image analysis module (510) may, as described herein, comprise computer executable and/or readable program code that is to be executed by the raster image processor (505). In an example, the executable code defining the image analysis module (510) may be maintained on a number of the modules (506, 507, 508) of the data storage device (502). In this example, the image analysis module (510) is maintained as a computer readable storage medium of a computer program product. The data storage device (502) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

In an example, the image analysis module (510) may be an application specific integrated circuit (ASIC). This ASIC may be communicatively coupled to the raster image processor (505) via the bus (501). In this example, a processor may be coupled to the image analysis module (510) and communicate with the raster image processor (505) in order to execute the processes descried herein.

The printing device (500) may also include a number of peripheral device adapters (503) to enable the raster image processor (505) to interface with various other hardware elements, external and internal to the printing device (500). For example, the peripheral device adapters (503) may provide an interface to input/output devices, such as, for example, display device, a mouse, or a keyboard. The peripheral device adapters (503) may also provide access to other external devices such as an external storage device, a number of network devices such as, for example, servers, switches, and routers, client devices, other types of computing devices, and combinations thereof.

The printing device (500) may be utilized in any data processing scenario including, stand-alone hardware, mobile applications, through a computing network, or combinations thereof. Further, the printing device (500) may be used in a computing network, a public cloud network, a private cloud network, a hybrid cloud network, other forms of networks, or combinations thereof. In one example; the methods provided by the printing device (500) are provided as a service over a network by, for example, a third party. In this example, the service may comprise, for example, the following: a Software as a Service (SaaS) hosting a number of applications; a Platform as a Service (PaaS) hosting a computing platform comprising, for example, operating systems, hardware, and storage, among others; an Infrastructure as a Service (IaaS) hosting equipment such as, for example, servers, storage components, network, and components; among others; application program interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the printing device (500) are executed by a local administrator.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, the raster image processor (505) of the printing device (500) or other programmable data processing apparatus, implement the functions or acts specified in the flowchart and/or block diagram block or blocks. In one example; the computer usable program code may be embodied within a computer readable storage medium; the computer readable storage medium being part of the computer program product. In one example, the computer readable storage medium is a non-transitory computer readable medium.

The specification and figures describe a method and system that selectively applies plasma treatment to the surface of a print media based on image data. Specifically, the image data determines where to apply a plasma treatment based on where printing fluid it to be placed on the print media. In this example, wherever printing fluid is to be placed on the print media, a plasma emitter pretreats that portion of the print media prior to application of the printing fluid. Generation of the image data may not be computationally expensive and could be completed with a raster image processor. The present method and system may permit the use of a lower-cost print media for print jobs as a result of pretreating the print media to overcome any deficiencies in the lower cost print media. Consequently, this may lower the cost-per-page for overall printing device systems.

The offset 2-D arrays of plasma emitters described herein permit control of plasma pre-treatment during operation. Those areas that are to be plasma treated is activated, thereby reducing running cost and duty cycle of the plasma systems.

The resulting better vibrancy of printing fluid as a result of this plasma pre-treatment process results in reduced printing fluid usage, which also reduces costs of operation of the printing device. Still further, reduced printing fluid usage results in a reduction in dryer power or an increased print speed at the same dryer power level.

Plasma pre-treatment according to the process described herein also increases the variety of print media that can be used. This includes both lower cost print media as well as print media that includes different properties that are otherwise unsuitable for water-based printing.

In the case where the plasma emitters are located before the apparatus depositing the printing fluid, it may be possible to operate without a fixer bars in the press to apply a fluidic fixer pre-treatment to the print media.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method, comprising:
   with a raster image processor, creating pre-treatment plane rasterized image data from source image data; and
   with a plasma emitter, selectively applying a plasma treatment to a surface of a print media based on the pre-treatment plane rasterized image data.

2. The method of claim 1, wherein the pre-treatment plane rasterized image data is of a lower resolution than the source image data.

3. The method of claim 2, wherein creating the pre-treatment plane rasterized image data at a lower resolution than the source image data comprises applying a fixer blooming process to the source image data and combing the pre-treatment plane rasterized image data with a remaining rasterized image data.

4. The method of claim 1, wherein creating the pre-treatment plane rasterized image data comprises rasterizing the source image data in a monochromatic setting.

5. The method of claim 4, wherein rasterizing the source image data in a monochromatic setting occurs subsequent to the raster image processor rasterizing the source image data in preparation to apply a plurality of colors of printing fluid to a media during a print operation.

6. The method of claim 1, comprising forming a two-dimensional layout of the pre-treatment plane rasterized image data prior to selectively applying the plasma treatment to a surface of a print media.

7. A printing device, comprising:
   a raster image processor to execute an image analysis module to create pre-treatment plane rasterized image data from source image data; and
   a plasma emitting device to selectively apply a plasma treatment to a surface of a print media based on the pre-treatment plane rasterized image data.

8. The printing device of claim 7, wherein the plasma emitting device is an array of selectively energized electrodes.

9. The printing device of claim 7, wherein the pre-treatment plane rasterized image data is of a lower resolution than the source image data.

10. The printing device of claim 9, wherein creating the pre-treatment plane rasterized image data at a lower resolution than the source image data comprises applying a fixer blooming process to the source image data and combing the pre-treatment plane rasterized image data with a remaining rasterized color image data.

11. The printing device of claim 7, wherein creating the pre-treatment plane rasterized image data comprises rasterizing the source image data in a monochromatic setting.

12. The printing device of claim 11, wherein rasterizing the source image data in a monochromatic setting occurs subsequent to the raster image processor rasterizing the source image data in preparation to apply a plurality of colors of printing fluid to a media during a print operation.

13. A computer program product, the computer program product comprising: a non-transitory computer readable storage medium comprising computer usable program code embodied therewith, the computer usable program code to, when executed by a processor: create pre-treatment plane rasterized image data from source image data; and selectively apply a plasma treatment to a surface of a print media based on the pre-treatment plane rasterized image data.

14. The computer program product of claim 13, wherein creating the pre-treatment plane rasterized image data comprises rasterizing the source image data in a monochromatic setting.

15. The computer program product of claim 13, comprising computer usable program code embodied therewith, the computer usable program code to, when executed by a processor to form a two-dimensional layout of the pre-treatment plane rasterized image data prior to selectively applying the plasma treatment to a surface of a print media.

* * * * *